US012767793B2

(12) United States Patent
Miyazaki et al.

(10) Patent No.: US 12,767,793 B2
(45) Date of Patent: Oct. 20, 2026

(54) NANOCELLULOSE/SURFACTANT COMPOSITE

(71) Applicant: SUMITOMO RUBBER INDUSTRIES, LTD., Kobe (JP)

(72) Inventors: Sumiko Miyazaki, Kobe (JP); Daisuke Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 987 days.

(21) Appl. No.: 17/881,852

(22) Filed: Aug. 5, 2022

(65) Prior Publication Data

US 2022/0380578 A1 Dec. 1, 2022

Related U.S. Application Data

(62) Division of application No. 16/883,191, filed on May 26, 2020, now abandoned.

(30) Foreign Application Priority Data

Jun. 24, 2019 (JP) ................................ 2019-116499

(51) Int. Cl.

*C08L 1/02* (2006.01)
*C08J 3/205* (2006.01)
*C08L 7/00* (2006.01)

(52) U.S. Cl.

CPC ............... *C08L 1/02* (2013.01); *C08J 3/2053* (2013.01); *C08L 7/00* (2013.01); *C08J 2307/02* (2013.01); *C08L 2205/16* (2013.01)

(58) Field of Classification Search

CPC .......... C08L 1/02; C08L 7/00; C08L 2205/16; C08L 1/04; C08J 3/2053; C08J 2307/02

See application file for complete search history.

(56) References Cited

U.S. PATENT DOCUMENTS

| | | | |
|---|---|---|---|
| 2015/0225550 A1 | 8/2015 | Banzashi et al. | |
| 2016/0002461 A1 | 1/2016 | Tsujii et al. | |
| 2016/0319176 A1 | 11/2016 | Konagaya et al. | |
| 2016/0340520 A1 | 11/2016 | Konagaya et al. | |
| 2017/0002182 A1 | 1/2017 | Imai et al. | |
| 2017/0226407 A1 | 8/2017 | Homma et al. | |
| 2017/0253754 A1* | 9/2017 | Kawaharada .......... | C09D 11/14 |
| 2020/0362146 A1 | 11/2020 | Morita et al. | |
| 2021/0024722 A1 | 1/2021 | Fujihashi et al. | |

FOREIGN PATENT DOCUMENTS

| | | | | |
|---|---|---|---|---|
| CN | 107474343 A | * | 12/2017 | ............. C08L 15/00 |
| CN | 107474343-MT | * | 12/2017 | |
| CN | 110317370 A | | 10/2019 | |
| CN | 111074675 A | | 4/2020 | |
| JP | 2014-141637 A | | 8/2014 | |
| JP | 2014-162880 A | | 9/2014 | |
| JP | 2014- 208721 A | | 11/2014 | |
| JP | 2017145280 A | * | 8/2017 | |
| JP | 2017145280-MT | * | 8/2017 | |
| JP | 2017-171881 A | | 9/2017 | |
| JP | 2017210596 A | * | 11/2017 | |
| JP | 2017210596-MT | * | 11/2017 | |
| JP | 2019-156868 A | | 9/2019 | |
| WO | WO 2010/066036 A1 | | 6/2010 | |
| WO | WO 2015/050117 A1 | | 4/2015 | |
| WO | WO 2015/152189 A1 | | 10/2015 | |
| WO | WO 2016/043146 A1 | | 3/2016 | |
| WO | WO 2018/147342 A1 | | 8/2018 | |

* cited by examiner

*Primary Examiner* — Robert S Jones, Jr.
*Assistant Examiner* — Zhen Liu
(74) *Attorney, Agent, or Firm* — Birch, Stewart, Kolasch & Birch, LLP

(57) ABSTRACT

The present invention provides nanocellulose/surfactant composites having excellent redispersibility in water and related compositions and methods, including methods for producing the composites. Included is a nanocellulose/surfactant composite containing a nanocellulose and a surfactant, the nanocellulose/surfactant composite having a moisture content of lower than 10%, the surfactant including an ionic surfactant having a weight average molecular weight of 3000 or more.

8 Claims, No Drawings

NANOCELLULOSE/SURFACTANT COMPOSITE

CROSS-REFERENCE TO RELATED APPLICATIONS

This application is a Divisional of U.S. application Ser. No. 16/883,191, filed on May 26, 2020, which claims the priority benefit under 35 U.S.C. 119(a) to Japanese Patent Application No. 2019-116499, filed on Jun. 24, 2019, all of which are hereby expressly incorporated by reference into the present application.

TECHNICAL FIELD

The present invention relates to nanocellulose/surfactant composites and production methods and rubber compositions thereof.

BACKGROUND ART

Nanocelluloses such as cellulose nanofibers (CNF) and cellulose nanocrystals (CNC) can impart excellent properties including high strength with lightweight. Thus, composite materials including such nanocelluloses have been proposed.

For example, some nanocelluloses are provided in the form of dried products prepared by drying dispersions in which nanocelluloses are dispersed in aqueous media. In many cases, the dried products are redispersed in aqueous media, and the redispersions are combined with other materials such as rubbers or resins to produce composite materials.

Upon redispersion, however, nanocelluloses are sometimes not well dispersed. Disadvantageously, such redispersions, when combined with other materials, cannot provide composite materials in which the nanocelluloses are sufficiently dispersed. Therefore, there is a need for nanocellulose materials (dried products) having excellent redispersibility in water.

SUMMARY OF INVENTION

Technical Problem

The present invention aims to solve the problem and provide nanocellulose/surfactant composites having excellent redispersibility in water and related compositions and methods, including methods for producing the composites.

Solution to Problem

The present invention relates to a nanocellulose/surfactant composite, containing a nanocellulose and a surfactant, the nanocellulose/surfactant composite having a moisture content of lower than 10%, the surfactant including an ionic surfactant having a weight average molecular weight of 3000 or more.

Preferably, the nanocellulose includes at least one of a microfibrillated cellulose or a cellulose nanocrystal.

Preferably, the microfibrillated cellulose has an average fiber diameter of 2 to 50 nm, an average fiber length of 10 µm or less, and a degree of crystallinity of 60 to 90%.

Preferably, the cellulose nanocrystal has an average fiber diameter of 2 to 50 nm, an average fiber length of 500 nm or less, and a degree of crystallinity of 70% or more.

The present invention also relates to a method for producing the nanocellulose/surfactant composite, including steps of: mixing the ionic surfactant with a dispersion of the nanocellulose to prepare a liquid mixture, and drying the liquid mixture.

The present invention also relates to a rubber composition, containing the nanocellulose/surfactant composite.

Advantageous Effects of Invention

The nanocellulose/surfactant composite of the present invention contains a nanocellulose and a surfactant and has a moisture content of lower than 10%. Further, the surfactant includes an ionic surfactant having a weight average molecular weight of 3000 or more. Such a composite has excellent redispersibility in water. Thus, the nanocellulose/surfactant composite can be used to provide well-dispersed nanocellulose composite materials.

DESCRIPTION OF EMBODIMENTS

[Nanocellulose/Surfactant Composite]

The nanocellulose/surfactant composite of the present invention contains a nanocellulose and an ionic surfactant having a weight average molecular weight of 3000 or more, and has a moisture content of lower than 10% by mass. The composite has excellent redispersibility in water and can be used to provide well-dispersed nanocellulose composite materials (e.g., rubber compositions containing rubber and nanocellulose).

The mechanism of this effect is not clear, but may be explained as follows.

In the case of low moisture content nanocellulose products (e.g., dried products) prepared by drying dispersions of nanocelluloses in water, when redispersed in water they tend not to reconstruct dispersions in which the nanocelluloses are sufficiently dispersed. Presumably, this is because the nanocelluloses in the dried products or the like strongly aggregate to each other, and this strong aggregation force inhibits the nanocelluloses from redispersing in water.

In contrast, low moisture content nanocellulose products prepared by drying dispersions of nanocelluloses and ionic surfactants having a predetermined molecular weight in water can be redispersed to reconstruct excellently dispersed nanocellulose dispersions. Presumably, this is because the specific surfactants inhibit the aggregation of the nanocelluloses in the dried products or the like, thereby enabling reconstruction of dispersions in which the nanocelluloses are sufficiently dispersed upon redispersion. Thus, a composite containing a nanocellulose and a specific surfactant and having a moisture content adjusted to lower than 10% by mass is considered to have excellent redispersibility in water. It is also considered that a nanocellulose redispersion prepared from the composite can be used to provide excellently dispersed nanocellulose composite materials.

The nanocellulose/surfactant composite has a moisture content (proportion of the contained water) of lower than 10% by mass based on 100% by mass of the composite. The moisture content of the composite may be 7% by mass or lower, 5% by mass or lower, or 3% by mass or lower. The composite even with such a low moisture content can be redispersed in water to provide a well-dispersed nanocellulose dispersion.

The moisture content is measured in accordance with JIS A 1476:2006 "Measuring method for moisture content of building materials by drying at elevated temperature".

(Nanocellulose)

The nanocellulose in the nanocellulose/surfactant composite is a cellulose fiber having a nano-sized fiber size (diameter) and may be prepared by disintegrating (fibrillating) cellulose fiber-containing materials (e.g., wood pulp) into nano-sized fibers. In the nanocellulose, cellulose molecules are aggregated together into nano-sized diameter fibers, and such cellulose molecules are linked by hydrogen bonding. In plant cell walls, the smallest units are cellulose microfibrils each having a width of about 4 nm (single cellulose nanofibers) and form basic structural materials of plants. The nanocellulose is a nano-sized cellulose formed of a cellulose microfibril or an aggregate of cellulose microfibrils.

Suitable examples of the nanocellulose include microfibrillated celluloses (cellulose nanofibers (CNF)) and cellulose nanocrystals (CNC). One type or a combination of two or more types of nanocelluloses may be used.

The CNF fiber can be prepared by treating cellulose fibers via, for example, mechanical fibrillation. A method for preparing the CNF may be performed by fibrillating a cellulose fiber-containing material such as pulp, e.g., by mechanically grinding or beating a water suspension or slurry of the cellulose fiber-containing material using a refiner, a high-pressure homogenizer, a grinder, a single or multi-screw kneader (preferably twin screw kneader), a bead mill, or other devices.

From the standpoints of dispersibility in a matrix and other properties, the CNF preferably has an average fiber diameter of 10 μm or less. The average fiber diameter is more preferably 500 nm or less, still more preferably 100 nm or less, particularly preferably 50 nm or less. The lower limit of the average fiber diameter is not limited, but is preferably 1 nm or more, more preferably 2 nm or more, still more preferably 3 nm or more.

The CNF preferably has an average fiber length of 100 nm or more, more preferably 300 nm or more, still more preferably 500 nm or more. The upper limit is also preferably 50 μm or less, more preferably 10 μm or less. Moreover, the CNF preferably has an aspect ratio (average fiber length/average fiber diameter) of 10 or more.

The CNC crystal can be prepared by chemically treating cellulose fibers via, for example, acid hydrolysis. A method for preparing the CNC may be performed by known methods, such as a chemical technique which includes treating a water suspension or slurry of the aforementioned cellulose fiber-containing material via, for example, acid hydrolysis with an acid such as sulfuric acid, hydrochloric acid, or hydrobromic acid.

From the standpoints of dispersibility in a matrix and other properties, the CNC preferably has an average fiber diameter of 10 μm or less. The average fiber diameter is more preferably 500 nm or less, still more preferably 100 nm or less, particularly preferably 50 nm or less. The lower limit of the average fiber diameter is not limited, but is preferably 1 nm or more, more preferably 2 nm or more, still more preferably 3 nm or more.

The CNC preferably has an average fiber length of 50 nm or more, more preferably 80 nm or more, still more preferably 100 nm or more. The upper limit is preferably 800 nm or less, more preferably 500 nm or less, still more preferably 300 nm or less.

Herein, the average fiber diameter and average fiber length of the nanocellulose may be measured by image analysis using scanning electron micrographs, image analysis using transmission electron micrographs, image analysis using atomic force micrographs, X-ray scattering data analysis, the aperture impedance method (Coulter principle), or other methods. As used herein, the average fiber diameter and average fiber length of the nanocellulose (cellulose fiber) typically refer to the average fiber diameter and average fiber length, respectively, of the aggregates of cellulose fibrils formed by aggregation of cellulose molecules.

The CNF usually has a degree of crystallinity of 90% or less, and the degree of crystallinity may be 80% or less or 70% or less. From the standpoints of dispersibility in a rubber matrix and other properties, the lower limit of the degree of crystallinity is preferably 30% or more, more preferably 50% or more, still more preferably 60% or more.

The CNC preferably has a degree of crystallinity of 70% or more, more preferably 75% or more, still more preferably 80% or more, from the standpoints of dispersibility in a rubber matrix and other properties. The upper limit of the degree of crystallinity is not limited and may be 100%.

Herein, the degree of crystallinity of the nanocellulose refers to the degree of cellulose I crystallinity calculated from diffraction intensity data obtained by X-ray diffraction in accordance with the Segal's method and is defined by the following equation:

$$\text{Degree of cellulose I crystallinity (\%)}=[(I22.6-I18.5)/I22.6]\times 100$$

wherein I22.6 denotes the diffraction intensity of the lattice plane (002) (diffraction angle 2θ=22.6°), and I18.5 denotes the diffraction intensity of the amorphous portion (diffraction angle 2θ=18.5°) in X-ray diffraction.

Examples of the raw material (cellulose) of the nanocellulose include plant-derived celluloses such as softwood kraft pulp, hardwood kraft pulp, Manila hemp pulp, sisal hemp pulp, bamboo pulp, esparto pulp, and cotton pulp; regenerated celluloses such as regenerated celluloses (polynosic rayons) with a high degree of polymerization produced by spinning in a low acid bath, and solvent-spun rayons produced using amine-oxide organic solvents; bacterial celluloses; animal-derived celluloses such as sea squirt-derived cellulose; and nanocelluloses produced by electrospinning.

The nanocellulose may be produced from a plant-derived cellulose by a physical or chemical method. Examples of the physical (fibrillation) method include a high-pressure homogenizer method, a microfluidizer method, a ball mill method, and a grinding mill method. Examples of the chemical method include a TEMPO oxidation method.

The nanocellulose may also be, for example, one in which some lignin or hemicellulose remains or one which has a chemically modified surface (modified pulp). For example, the modified pulp may be one in which the hydroxyl groups of cellulose fibers are modified by at least one method selected from esterification or etherification. Moreover, the cross sectional shape of the nanocellulose may be either anisotropic (e.g., flat) or isotropic (e.g., perfect circle or regular polygon).

(Ionic Surfactant)

The ionic surfactant has a weight average molecular weight (Mw) of 3000 or more. A Mw in this range tends to provide good redispersibility in water. The Mw is more preferably 4000 or more, still more preferably 5000 or more. The upper limit is not limited, but is preferably 50000 or less, more preferably 30000 or less, still more preferably 25000 or less. Herein, the Mw can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

Examples of the ionic surfactant in the nanocellulose/surfactant composite include anionic surfactants and cationic surfactants. From the standpoint of redispersibility in water, anionic surfactants are preferred among these. One type or a combination of two or more types of ionic surfactants may be used.

An anionic surfactant has a hydrophobic group and a hydrophilic group. The hydrophobic group may be any functional group with hydrophobicity but is preferably a hydrocarbon group. The hydrocarbon group may be a linear, branched, or cyclic. Examples include aliphatic, alicyclic, and aromatic hydrocarbon groups. Preferred among these are aliphatic or aromatic hydrocarbon groups. The hydrocarbon group preferably has a carbon number of 4 to 20, more preferably 4 to 15, still more preferably 4 to 12.

Preferred among the aliphatic hydrocarbon groups are C1-C20, more preferably C1-C10, still more preferably C1-C6 aliphatic hydrocarbon groups. Preferred examples include alkyl groups having the above-mentioned number of carbon atoms. Specific examples include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Other examples include alkenyl or alkynyl groups having the above-mentioned number of carbon atoms, for example, alkenyl groups such as vinyl, allyl, 1-propenyl, 1-methylethenyl, and isobutylene groups, and alkynyl groups such as ethynyl and propargyl groups. Among these, an isobutylene group is preferred.

Preferred among the alicyclic hydrocarbon groups are C3-C8 alicyclic hydrocarbon groups. Specific examples include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

Preferred among the aromatic hydrocarbon groups are C6-C12 aromatic hydrocarbon groups. Specific examples include phenyl, benzyl, phenethyl, tolyl, xylyl, and naphthyl groups, among which phenyl, benzyl, and phenethyl groups are preferred, with a phenyl or benzyl group being more preferred, with a phenyl group being particularly preferred. The tolyl or xylyl group may have a methyl substituent(s) at any of the ortho, meta, and para positions on the benzene ring.

The hydrophilic group is preferably at least one selected from the group consisting of carboxyl, sulfonate, sulfate, and phosphate groups, among which a carboxyl or sulfonate group is more preferred, with a carboxyl group being particularly preferred.

In a preferable embodiment, the anionic surfactant has any of the above-mentioned functional groups. Specifically, it may be classified as, for example, a carboxylate surfactant, a sulfonate surfactant, a sulfate surfactant, or a phosphate surfactant.

Examples of the carboxylate surfactant include C6-C30 fatty acid salts, polycarboxylic acid salts, rosin acid salts, dimer acid salts, polymer acid salts, tall oil fatty acid salts, and polycarboxylate polymeric surfactants, among which C10-C20 carboxylic acid salts, polycarboxylic acid salts, and polycarboxylate polymeric surfactants are preferred. Examples of the sulfonate surfactant include alkylbenzene sulfonates, alkylsulfonates, alkylnaphthalene sulfonates, naphthalene sulfonates, and diphenyl ether sulfonates. Examples of the sulfate surfactant include alkylsulfates, polyoxyalkylene alkylsulfates, polyoxyalkylene alkylphenyl ether sulfates, tristyrenated phenol sulfates, distyrenated phenol sulfates, α-olefin sulfates, alkylsuccinic acid sulfates, polyoxyalkylene tristyrenated phenol sulfates, and polyoxyalkylene distyrenated phenol sulfates. Examples of the phosphate surfactant include alkylphosphates and polyoxyalkylene phosphates. Examples of these compound salts include metal salts (e.g., Na, K, Ca, Mg, and Zn), ammonium salts, and amine salts (e.g., triethanolamine salts).

Examples of the alkyl groups of these surfactants include C4-C30 alkyl groups. Examples of the polyoxyalkylene groups thereof include those having C2-C4 alkylene groups, such as ones in which the number of moles of ethylene oxide added is about 1 to 50.

Likewise, a cationic surfactant has a hydrophobic group and a hydrophilic group. Examples of the cationic surfactant include quaternary ammonium salt surfactants. Specifically, suitable are surfactants having a quaternary ammonium group and a hydrocarbon group as represented by the following formula:

$$[R^{11}R^{12}R^{13}R^{14}N]^{+}X^{-}$$

wherein $R^{11}$ and $R^{12}$ are the same as or different from each other and each represent a C1-C22 alkyl or alkenyl group, and at least one of $R^{11}$ and $R^{12}$ has 4 or more carbon atoms; $R^{13}$ and $R^{14}$ each represent a C1-C3 alkyl group; and X represents a monovalent anion.

In the formula, preferably, one of $R^{11}$ and $R^{12}$ is a methyl group and the other is a C6-C18 alkyl group. $R^{13}$ and $R^{14}$ are each preferably a methyl group. Examples of X include halogen ions such as chloride or bromide ions.

Specific examples of the cationic surfactants of the above formula include alkyltrimethylammonium salts such as hexyltrimethylammonium chloride, octyltrimethylammonium chloride, decyltrimethylammonium chloride, dodecyltrimethylammonium chloride, tetradecyltrimethylammonium chloride, hexadecyltrimethylammonium chloride, and stearyltrimethylammonium chloride, and their corresponding bromides. Hexadecyltrimethylammonium bromide is preferred among these as it can enhance dispersibility of the nanocellulose.

The surfactant may be a commercial product available from, for example, Elementis PLC, Kao Corporation, Dai-Ichi Kogyo Seiyaku Co., Ltd., or Sanyo Chemical Industries, Ltd.

From the standpoint of redispersibility in water, the nanocellulose/surfactant composite preferably contains the ionic surfactant in an amount of 5 to 50 parts by mass relative to 100 parts by mass of the nanocellulose (solids content). The amount is more preferably 9 parts by mass or more, still more preferably 10 parts by mass or more. The upper limit is more preferably 25 parts by mass or less, still more preferably 20 parts by mass or less.

The nanocellulose/surfactant composite containing a nanocellulose and a surfactant may be produced, for example, by a method including: a step (step (1)) of mixing the ionic surfactant with a dispersion of the nanocellulose to prepare a liquid mixture; and a step (step (2)) of drying the liquid mixture. In addition to the above-mentioned steps, the production method may further include other steps. Moreover, each step may be performed either once or repeatedly.

(Step (1))

Step (1) includes mixing the ionic surfactant with a dispersion of the nanocellulose to prepare a liquid mixture.

The method of mixing the ionic surfactant with a dispersion of the nanocellulose to prepare a liquid mixture in step (1) may be carried out, for example, by mixing the ionic surfactant with a dispersion of the nanocellulose using a known agitator such as a high-speed homogenizer, an ultrasonic homogenizer, a colloid mill, or a blender mill. The temperature and duration for preparing the liquid mixture may be appropriately selected so that the ionic surfactant and a dispersion of the nanocellulose are sufficiently mixed; for example, preferably at a temperature of 10 to 40° C. for 3 to 120 minutes, more preferably at a temperature of 15 to 30° C. for 5 to 90 minutes.

The dispersion of the nanocellulose may be prepared by known methods. For example, it may be prepared by dispersing the nanocellulose in water using a mixer such as a high-pressure homogenizer, an ultrasonic homogenizer, or a colloid mill. The temperature and duration for the preparation may be appropriately selected in view of the dispersion state. The amount (solids content) of the nanocellulose in the dispersion of the nanocellulose is not limited, but from the standpoint of uniform dispersibility, it is 0.1 to 20% by mass, preferably 0.2 to 10% by mass, more preferably 0.3 to 5% by mass of the dispersion (100% by mass).

(Step (2))

Step 2 includes drying the liquid mixture obtained in step 1.

The drying method is not limited and known drying methods that can evaporate the aqueous medium in the liquid mixture may be appropriately used.

The drying temperature in step 2 may be appropriately selected. For example, from the standpoints of drying efficiency and other properties, the drying temperature is preferably 100° C. or higher, more preferably 105° C. or higher, still more preferably 110° C. or higher. The upper limit is not limited, but is preferably 200° C. or lower, more preferably 190° C. or lower, still more preferably 180° C. or lower.

The drying duration in step 2 may be appropriately selected depending on the drying temperature. The duration may be selected such that the desired amount of water can be removed. The drying duration may be one minute to 12 hours, for example. In view of drying efficiency and other properties, it may be, for example, 10 minutes to 10 hours or may be 30 minutes to five hours. The drying step allows the resulting nanocellulose/surfactant composite to have a moisture content of lower than 10% by mass.

[Nanocellulose/Rubber Composite]

A nanocellulose/rubber composite can be produced from the liquid mixture containing the ionic surfactant and the nanocellulose obtained in step 1. However, since the nanocellulose/surfactant composite has excellent redispersibility in water, as described earlier, a well-dispersed nanocellulose/rubber composite can also be produced from a redispersion prepared by redispersing in water the nanocellulose/surfactant composite obtained by step 2 (drying).

Specifically, an excellently dispersed nanocellulose/rubber composite can be produced by a method including: a step (step 3) of mixing a redispersion of the nanocellulose/surfactant composite with a rubber latex to prepare a compounded latex; and a step (step 4) of coagulating the compounded latex. In addition to the above-mentioned steps, the production method may further include other steps. Moreover, each step may be performed either once or repeatedly.

(Step 3)

Step 3 includes mixing a redispersion of the nanocellulose/surfactant composite with a rubber latex to prepare a compounded latex.

The redispersion of the nanocellulose/surfactant composite may be prepared by mixing the nanocellulose/surfactant composite with water. The preparation of the redispersion may be carried out by known methods, such as by dispersing the nanocellulose-containing composite in water using a mixer such as a high-pressure homogenizer, an ultrasonic homogenizer, or a colloid mill. The temperature and duration for the preparation may be appropriately selected in view of the dispersion state. The amount (solids content) of the nanocellulose in the redispersion is not limited, but from the standpoint of uniform dispersibility, it is 0.1 to 20% by mass, preferably 0.2 to 10% by mass, more preferably 0.3 to 5% by mass of the redispersion (100% by mass).

Suitable examples of the rubber latex include diene rubber latexes such as natural rubber latex and synthetic diene rubber latexes (e.g., latexes of polybutadiene rubber (BR), styrene-butadiene rubber (SBR), styrene-isoprene-butadiene rubber (SIBR), polyisoprene rubber, acrylonitrile butadiene rubber, ethylene vinyl acetate rubber, chloroprene rubber, vinylpyridine rubber, or butyl rubber). These rubber latexes may be used alone or in combinations of two or more. Natural rubber latex, SBR latex, BR latex, and polyisoprene rubber latex are more preferred among these, with natural rubber latex being further preferred.

The pH of the rubber latex is preferably 8.5 or higher, more preferably 9.5 or higher. A rubber latex having a pH lower than 8.5 tends to be unstable and easily coagulate. The pH of the rubber latex is preferably 12 or lower, more preferably 11 or lower. A rubber latex having a pH higher than 12 may be degraded.

The rubber latex may be prepared by conventionally known methods. Alternatively, it may be any commercial product. The rubber latex preferably has a rubber solids content of 10 to 80% by mass, more preferably 20 to 60% by mass.

During the mixing in step 3, the redispersion of the nanocellulose/surfactant composite and the rubber latex may be mixed and sufficiently stirred until they form a uniform dispersion to prepare a compounded latex. The mixing may be carried out, for example: by dropwise adding the redispersion of the nanocellulose/surfactant composite to the rubber latex placed in a known agitator such as a blender mill with stirring; or by dropwise adding the rubber latex to the redispersion of the nanocellulose/surfactant composite while stirring.

The pH of the compounded latex is preferably 9.0 or higher, more preferably 9.5 or higher. A compounded latex having a pH lower than 9.0 tends to be unstable. The pH of the compounded latex is preferably 12 or lower, more preferably 11.5 or lower. A compounded latex having a pH higher than 12 may be degraded.

In step 3, from the standpoint of dispersibility of the nanocellulose, the redispersion is preferably mixed with the rubber latex such that the amount of the nanocellulose is 1 to 150 parts by mass relative to 100 parts by mass of the rubber solids in the rubber latex. The amount of the nanocellulose is more preferably 5 parts by mass or more, but is more preferably 100 parts by mass or less, still more preferably 70 parts by mass or less, particularly preferably 30 parts by mass or less.

The mixing temperature and duration in step 3 are preferably at 10 to 40° C. for 3 to 120 minutes, more preferably at 15 to 30° C. for 5 to 90 minutes, in order to prepare a uniform compounded latex.

(Step 4)

Step 4 includes coagulating the resulting compounded latex. The coagulation may be accomplished, for example, by adjusting the pH of the compounded latex obtained in step 3 to 3 to 5, preferably 3 to 4. The coagulation of the compounded latex by pH adjustment may usually be carried out by adding an acid to the compounded latex. Examples of the acid for coagulation include sulfuric acid, hydrochloric acid, formic acid, and acetic acid. The coagulation step is preferably performed at 10 to 40° C.

A flocculant may also be added to control the coagulation (the size of the coagulated particle aggregates). Examples of the flocculant include cationic polymers.

The resulting coagula (aggregates containing the coagulated rubber and nanocellulose) may be filtrated, dried, further dried, and subjected to rubber kneading using a kneading machine such as a two-roll mill or a Banbury mixer by known methods to obtain a nanocellulose/rubber composite in which the nanocellulose is uniformly dispersed in the rubber matrix. The nanocellulose/rubber composite may contain other components as long as the effect is not inhibited.

[Rubber Composition]

The nanocellulose/rubber composite may be used in the form of a masterbatch. For example, a rubber composition containing the nanocellulose/rubber composite can be used in a variety of applications. In the nanocellulose/rubber composite, the nanocellulose is sufficiently dispersed in the rubber. Thus, a rubber composition obtained by mixing the nanocellulose/rubber composite with other components can also achieve sufficient dispersion of the nanocellulose. This provides effective reinforcement and a balanced improvement of rubber physical properties including durability (tensile strength at break) and fuel economy.

The rubber composition contains a rubber component. The rubber component preferably includes the rubber component derived from the rubber latex such as natural rubber latex, SBR latex, BR latex, or polyisoprene rubber latex (the rubber component contained in the nanocellulose/rubber composite) in an amount of 50% by mass or more, more preferably 75% by mass or more, still more preferably 85% by mass or more. The amount may be 100% by mass.

In particular, the rubber component preferably includes a natural rubber derived from a natural rubber latex (a natural rubber contained in a composite produced from a nanocellulose and a natural rubber latex) in an amount of 50% by mass or more, more preferably 75% by mass or more, still more preferably 85% by mass or more, based on 100% by mass of the rubber component. The amount may be 100% by mass.

The rubber component of the rubber composition may include an additional rubber component other than the rubber (rubber component) contained in the nanocellulose/rubber composite. Examples of the additional rubber component include diene rubbers such as isoprene-based rubbers, polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile butadiene rubber (NBR). Other examples include butyl rubbers and fluororubbers. These rubbers may be used alone or in combinations of two or more. From the standpoints of tire physical properties, SBR, BR, and isoprene-based rubbers are preferred as the rubber component.

The additional rubber component may include an unmodified diene rubber or a modified diene rubber.

The modified diene rubber may be any diene rubber having a functional group interactive with a filler such as silica. For example, it may be a chain end-modified diene rubber obtained by modifying at least one chain end of a diene rubber with a compound (modifier) having the functional group (chain end-modified diene rubber terminated with the functional group); a backbone-modified diene rubber having the functional group in the backbone; a backbone- and chain end-modified diene rubber having the functional group in both the backbone and chain end (e.g., a backbone- and chain end-modified diene rubber in which the backbone has the functional group and at least one chain end is modified with the modifier); or a chain end-modified diene rubber that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

Non-limiting examples of the SBR include emulsion-polymerized styrene-butadiene rubber (E-SBR) and solution-polymerized styrene-butadiene rubber (S-SBR). These types of SBR may be used alone or in combinations of two or more.

From the standpoints of tire physical properties, the SBR preferably has a styrene content of 5% by mass or higher, more preferably 10% by mass or higher, still more preferably 15% by mass or higher. The styrene content is also preferably 60% by mass or lower, more preferably 40% by mass or lower, still more preferably 30% by mass or lower.

Herein, the styrene content of the SBR is determined by $^{1}$H-NMR.

The SBR may be a commercial product manufactured or sold by, for example, Sumitomo Chemical Co., Ltd., JSR Corporation, Asahi Kasei Corporation, or Zeon Corporation.

The SBR may be an unmodified SBR or a modified SBR. Examples of the modified SBR include those into which functional groups as listed for the modified diene rubber are introduced.

From the standpoints of wet grip performance and other properties, the amount of the SBR, if present, based on 100% by mass of the rubber component is preferably 10 to 90% by mass, more preferably 20 to 80% by mass.

Non-limiting examples of the BR include high cis BR having high cis content, BR containing syndiotactic polybutadiene crystals, and BR synthesized using rare earth catalysts (rare earth-catalyzed BR). These types of BR may be used alone or in combinations of two or more. In particular, the BR is preferably a high cis BR having a cis content of 90% by mass or higher to improve abrasion resistance.

The BR may be an unmodified BR or a modified BR. Examples of the modified BR include those into which functional groups as listed for the modified diene rubber are introduced.

From the standpoints of abrasion resistance and other properties, the amount of the BR, if present, based on 100% by mass of the rubber component is preferably 10 to 90% by mass, more preferably 20 to 80% by mass.

The BR may be a commercial product of, for example, Ube Industries, Ltd., JSR Corporation, Asahi Kasei Corporation, or Zeon Corporation.

Examples of the isoprene-based rubbers include natural rubber (NR), polyisoprene rubber (IR), refined NR, modified NR, and modified IR. The NR may be one commonly used in the rubber industry such as SIR20, RSS #3, or TSR20. Non-limiting examples of the IR include those commonly used in the rubber industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These isoprene-based rubbers may be used alone or in combinations of two or more.

From the standpoints of fuel economy and other properties, the amount of the isoprene-based rubber, if present, based on 100% by mass of the rubber component is preferably 10 to 90% by mass, more preferably 20 to 80% by mass.

From the standpoints of rubber physical properties, the amount of the nanocellulose per 100 parts by mass of the rubber component in the rubber composition is preferably 2 parts by mass or more, more preferably 5 parts by mass or more, still more preferably 7 parts by mass or more. From the standpoints of dispersibility of the nanocellulose and other properties, the amount is also preferably 100 parts by mass or less, more preferably 50 parts by mass or less, still more preferably 30 parts by mass or less.

The rubber composition may contain additional fillers other than the nanocellulose. Examples of the additional fillers include carbon black, silica, calcium carbonate, talc, alumina, clay, aluminum hydroxide, aluminum oxide, and mica. From the standpoints of tire physical properties, carbon black or silica is preferred among these.

Non-limiting examples of the carbon black include N134, N110, N220, N234, N219, N339, N330, N326, N351, N550, and N762. Examples of commercial products include those available from Asahi Carbon Co., Ltd., Cabot Japan K.K., Tokai Carbon Co., Ltd., Mitsubishi Chemical Corporation, Lion Corporation, NSCC Carbon Co., Ltd, and Columbia Carbon. These may be used alone or in combinations of two or more.

The amount of the carbon black per 100 parts by mass of the rubber component is preferably 5 parts by mass or more, more preferably 15 parts by mass or more. When the amount is not less than the lower limit, good properties such as abrasion resistance and grip performance tend to be obtained. The amount is also preferably 100 parts by mass or less, more preferably 50 parts by mass or less. When the amount is not more than the upper limit, the rubber composition tends to obtain good processability.

The carbon black preferably has a nitrogen adsorption specific surface area ($N_2SA$) of 50 $m^2/g$ or more, more preferably 80 $m^2/g$ or more, still more preferably 100 $m^2/g$ or more. When the $N_2SA$ is not less than the lower limit, good abrasion resistance and good grip performance tend to be obtained. The $N_2SA$ is also preferably 200 $m^2/g$ or less, more preferably 150 $m^2/g$ or less, still more preferably 130 $m^2/g$ or less. Carbon black having a $N_2SA$ of not more than the upper limit tends to exhibit good dispersibility.

The nitrogen adsorption specific surface area of the carbon black can be determined in accordance with JIS K6217-2:2001.

Examples of the silica include dry silica (anhydrous silica) and wet silica (hydrous silica). Wet silica is preferred among these because it contains a large number of silanol groups. Examples of usable commercial products include those available from Degussa, Rhodia, Tosoh Silica Corporation, Solvay Japan, and Tokuyama Corporation. These may be used alone or in combinations of two or more.

The amount of the silica per 100 parts by mass of the rubber component is preferably 25 parts by mass or more, more preferably 30 parts by mass or more, still more preferably 50 parts by mass or more. When the amount is not less than the lower limit, good wet grip performance and good handling stability tend to be obtained. The upper limit of the amount is not limited but is preferably 300 parts by mass or less, more preferably 200 parts by mass or less, still more preferably 170 parts by mass or less, particularly preferably 100 parts by mass or less, most preferably 80 parts by mass or less. When the amount is not more than the upper limit, good dispersibility tends to be obtained.

The silica preferably has a nitrogen adsorption specific surface area ($N_2SA$) of 70 $m^2/g$ or more, more preferably 140 $m^2/g$ or more, still more preferably 160 $m^2/g$ or more. When the $N_2SA$ is not less than the lower limit, good wet grip performance and good tensile strength at break tend to be obtained. The upper limit of the $N_2SA$ of the silica is not limited but is preferably 500 $m^2/g$ or less, more preferably 300 $m^2/g$ or less, still more preferably 250 $m^2/g$ or less. When the $N_2SA$ is not more than the upper limit, good dispersibility tends to be obtained.

The $N_2SA$ of the silica is measured by the BET method in accordance with ASTM D3037-93.

The rubber composition containing silica preferably further contains a silane coupling agent.

Non-limiting examples of the silane coupling agent include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Examples of commercial products include those available from Degussa, Momentive, Shin-Etsu Silicone, Tokyo Chemical Industry Co., Ltd., AZmax. Co., and Dow Corning Toray Co., Ltd. These silane coupling agents may be used alone or in combinations of two or more.

The amount of the silane coupling agent per 100 parts by mass of the silica is preferably 3 parts by mass or more, more preferably 6 parts by mass or more. When the amount is 3 parts by mass or more, good properties such as tensile strength at break tend to be obtained. The amount is also preferably 20 parts by mass or less, more preferably 15 parts by mass or less. The silane coupling agent in an amount of 20 parts by mass or less will produce an effect commensurate with the amount.

The rubber composition may contain a plasticizer.

From the standpoints of processability and other properties, the amount of the plasticizer per 100 parts by mass of the rubber component is preferably 2 parts by mass or more, more preferably 5 parts by mass or more, still more preferably 7 parts by mass or more. From the standpoints of tensile strength at break and other properties, the amount is also preferably 50 parts by mass or less, more preferably 30 parts by mass or less, still more preferably 20 parts by mass or less.

Non-limiting examples of the plasticizer include plastic materials which are liquid at 25° C., such as oils and liquid resins. One type or a combination of two or more types of these plasticizers may be used.

Non-limiting examples of the oils include conventionally known oils, for example: process oils such as paraffinic process oils, aromatic process oils, and naphthenic process oils; low PCA (polycyclic aromatic) process oils such as TDAE and MES; vegetable fats and oils; and mixtures thereof. From the standpoints of abrasion resistance and tensile properties, aromatic process oils are preferred among these. Specific examples of the aromatic process oils include Diana Process Oil AH series available from Idemitsu Kosan Co., Ltd.

Non-limiting examples of the liquid resins include liquid aromatic vinyl polymers, coumarone-indene resins, indene resins, terpene resins, rosin resins, and hydrogenated products of the foregoing.

Liquid aromatic vinyl polymers refer to resins produced by polymerizing α-methylstyrene and/or styrene. Examples include liquid resins such as styrene homopolymers, α-methylstyrene homopolymers, and copolymers of α-methylstyrene and styrene.

Liquid coumarone-indene resins refer to resins that contain coumarone and indene as main monomer components forming the skeleton (backbone) of the resins. Examples of monomer components which may be contained in the skeleton other than coumarone and indene include styrene, α-methylstyrene, methylindene, and vinyltoluene.

Liquid indene resins refer to liquid resins that contain indene as a monomer component forming the skeleton (backbone) of the resins.

Liquid terpene resins refer to liquid terpene-based resins typified by resins produced by polymerization of terpene compounds such as α-pinene, β-pinene, camphene or dipentene, and terpenephenol resins produced from terpene compounds and phenolic compounds.

Liquid rosin resins refer to liquid rosin-based resins typified by natural rosins, polymerized rosins, modified rosins, and ester compounds thereof, or hydrogenated products thereof.

The rubber composition may contain a solid resin (a polymer that is solid at room temperature (25° C.)

The amount of the solid resin, if present, per 100 parts by mass of the rubber component is preferably 1 part by mass or more, more preferably 3 parts by mass or more, still more preferably 5 parts by mass or more. The amount is also preferably 50 parts by mass or less, more preferably 30 parts by mass or less, still more preferably 20 parts by mass or less. When the amount is within the range indicated above, good wet grip performance tends to be obtained.

Non-limiting examples of the solid resin include solid styrene resins, coumarone-indene resins, terpene resins, p-t-butylphenol acetylene resins, acrylic resins, dicyclopentadiene resins (DCPD resins), C5 petroleum resins, C9 petroleum resins, and C5/C9 petroleum resins. These may be used alone or in combinations of two or more.

Solid styrene resins refer to solid polymers produced from styrenic monomers as structural monomers, and examples include polymers produced by polymerizing a styrenic monomer as a main component (50% by mass or more). Specific examples include homopolymers produced by polymerizing a styrenic monomer (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerizing two or more styrenic monomers, and copolymers of styrenic monomers and additional monomers copolymerizable therewith.

Examples of the additional monomers include acrylonitriles such as acrylonitrile and methacrylonitrile; unsaturated carboxylic acids such as acrylic acid and methacrylic acid; unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride.

In particular, solid α-methylstyrene resins (e.g., α-methylstyrene homopolymers, copolymers of α-methylstyrene and styrene) are preferred.

Examples of the solid coumarone-indene resins include solid resins having structural units as described for the liquid coumarone-indene resins.

Examples of the solid terpene resins include polyterpene, terpene phenol, and aromatic modified terpene resins.

Polyterpene resins refer to resins produced by polymerization of terpene compounds, or hydrogenated products of the resins. The term “terpene compound” refers to a hydrocarbon having a composition represented by $(C_5H_8)_n$ or an oxygen-containing derivative thereof, each of which has a terpene backbone and is classified as, for example, a monoterpene ($C_{10}H_{16}$), sesquiterpene ($C_{15}H_{24}$), or diterpene ($C_{20}H_{32}$). Examples of such terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the solid polyterpene resins include solid terpene resins made from the aforementioned terpene compounds, such as α-pinene resins, β-pinene resins, limonene resins, dipentene resins, and β-pinene-limonene resins, and solid hydrogenated terpene resins produced by hydrogenation of these terpene resins.

Examples of the solid terpenephenol resins include solid resins produced by copolymerization of the aforementioned terpene compounds and phenolic compounds, and solid resins produced by hydrogenation of these resins. Specific examples include solid resins produced by condensation of the aforementioned terpene compounds, phenolic compounds, and formaldehyde. The phenolic compounds include, for example, phenol, bisphenol A, cresol, and xylenol.

Examples of the solid aromatic modified terpene resins include solid resins obtained by modification of terpene resins with aromatic compounds, and solid resins produced by hydrogenation of these resins. The aromatic compounds may be any compound having an aromatic ring, including, for example: phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives, such as alkylstyrenes, alkoxystyrenes, and unsaturated hydrocarbon group-containing styrenes; coumarone; and indene.

Examples of the solid p-t-butylphenol acetylene resins include solid resins produced by condensation of p-t-butylphenol and acetylene.

The solid acrylic resins are not limited, but solvent-free solid acrylic resins are suitable because they contain little impurities and have a sharp molecular weight distribution.

Examples of the solvent-free solid acrylic resins include (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45, all of which are hereby incorporated by reference in their entirety) using no or minimal amounts of auxiliary raw materials such as polymerization initiators, chain transfer agents, and organic solvents. Herein, the term "(meth) acrylic" means methacrylic and acrylic.

Preferred are solid acrylic resins that are substantially free of auxiliary raw materials such as polymerization initiators, chain transfer agents, and organic solvents. Also preferred are such acrylic resins having a relatively narrow compositional distribution or molecular weight distribution, produced by continuous polymerization.

As described above, solid acrylic resins which are substantially free of auxiliary raw materials such as polymerization initiators, chain transfer agents, and organic solvents, namely which are of high purity, are preferred. The purity of the solid acrylic resins (the resin content of the resins) is preferably 95% by mass or more, more preferably 97% by mass or more.

Examples of the monomer components of the solid acrylic resins include (meth)acrylic acids and (meth)acrylic acid derivatives such as (meth)acrylic acid esters (e.g., alkyl esters, aryl esters, aralkyl esters), (meth)acrylamides, and (meth)acrylamide derivatives.

In addition to the (meth)acrylic acids or (meth)acrylic acid derivatives, aromatic vinyls, such as styrene, α-methylstyrene, vinyltoluene, vinylnaphthalene, divinylbenzene, trivinylbenzene, or divinylnaphthalene, may also be used as monomer components of the solid acrylic resins.

The solid acrylic resins may be formed only of the (meth)acrylic components or may further contain constituent components other than the (meth)acrylic components.

Moreover, the solid acrylic resins may contain a hydroxyl group, a carboxyl group, a silanol group, or other groups.

The plasticizer and the solid resin may each be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., or Taoka Chemical Co., Ltd.

From the standpoints of crack resistance, ozone resistance, and other properties, the rubber composition preferably contains an antioxidant.

Non-limiting examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl) propionate]methane. Among these, p-phenylenediamine or quinoline antioxidants are preferred, with N-(1,3-dimethylbutyl)-N'-phenyl-p-phenylenediamine or 2,2,4-trimethyl-1,2-dihydroquinoline polymer being more preferred. Examples of commercial products include those available from Seiko Chemical Co., Ltd., Sumitomo Chemical Co., Ltd., Ouchi Shinko Chemical Industrial Co., Ltd., and Flexsys.

The amount of the antioxidant per 100 parts by mass of the rubber component is preferably 0.2 parts by mass or more, more preferably 0.5 parts by mass or more. When the amount is not less than the lower limit, sufficient ozone resistance tends to be obtained. The amount is also preferably 7.0 parts by mass or less, more preferably 4.0 parts by mass or less. When the amount is not more than the upper limit, good appearance tends to be obtained.

The rubber composition preferably contains stearic acid. From the standpoint of the balance between the above-mentioned properties, the amount of the stearic acid per 100 parts by mass of the rubber component is preferably 0.5 to 10 parts by mass, more preferably 0.5 to 5 parts by mass.

The stearic acid may be conventionally known one, such as a commercial product of, for example, NOF Corporation, Kao Corporation, FUJIFILM Wako Pure Chemical Corporation, or Chiba Fatty Acid Co., Ltd.

The rubber composition preferably contains zinc oxide. From the standpoint of the balance between the above-mentioned properties, the amount of the zinc oxide per 100 parts by mass of the rubber component is preferably 0.5 to 10 parts by mass, more preferably 1 to 5 parts by mass.

The zinc oxide may be conventionally known one, such as a commercial product of, for example, Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The rubber composition may contain a wax. Non-limiting examples of the wax include petroleum waxes, natural waxes, and synthetic waxes produced by purifying or chemically treating a plurality of waxes. These waxes may be used alone or in combinations of two or more.

Examples of the petroleum waxes include paraffin waxes and microcrystalline waxes. The natural waxes may be any wax derived from non-petroleum resources, and examples include plant waxes such as candelilla wax, carnauba wax, Japan wax, rice wax, and jojoba wax; animal waxes such as beeswax, lanolin, and spermaceti; mineral waxes such as ozokerite, ceresin, and petrolatum; and purified products of the foregoing waxes. Examples of usable commercial products include those available from Ouchi Shinko Chemical Industrial Co., Ltd., Nippon Seiro Co., Ltd., and Seiko Chemical Co., Ltd. The amount of the wax may be selected appropriately in view of ozone resistance and cost.

The rubber composition preferably contains sulfur in order to form moderate crosslinks between polymer chains and achieve a good balance between the above-mentioned properties.

The amount of the sulfur per 100 parts by mass of the rubber component is preferably 0.1 parts by mass or more, more preferably 0.5 parts by mass or more, still more preferably 0.7 parts by mass or more, but is preferably 6.0 parts by mass or less, more preferably 4.0 parts by mass or less, still more preferably 3.0 parts by mass or less. When the amount is within the range indicated above, a good balance between the above-mentioned properties tends to be achieved.

Examples of the sulfur include those commonly used in the rubber industry, such as powdered sulfur, precipitated sulfur, colloidal sulfur, insoluble sulfur, highly dispersible sulfur, and soluble sulfur. Examples of usable commercial products include those available from Tsurumi Chemical Industry Co., Ltd., Karuizawa Sulfur Co., Ltd., Shikoku Chemicals Corporation, Flexsys, Nippon Kanryu Industry Co., Ltd., and Hosoi Chemical Industry Co., Ltd. These may be used alone or in combinations of two or more.

The rubber composition preferably contains a vulcanization accelerator.

The amount of the vulcanization accelerator is not limited and may be arbitrarily selected according to the desired cure rate and crosslink density. Yet, the amount is usually 0.3 to 10 parts by mass, preferably 0.5 to 7 parts by mass per 100 parts by mass of the rubber component.

Any type of vulcanization accelerator may be used including usually used ones. Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. From the standpoint of the balance between the above-mentioned properties, sulfenamide or guanidine vulcanization accelerators are preferred.

In addition to the above-mentioned components, the rubber composition may appropriately contain usual additives used in applied fields, such as release agents or pigments.

The rubber composition can be prepared by known methods, such as by kneading components including the filler/rubber composite in a rubber kneading machine such as an open roll mill or a Banbury mixer, and vulcanizing the kneaded mixture.

The kneading conditions are as follows. In a base kneading step that includes kneading additives other than vulcanizing agents and vulcanization accelerators, the kneading temperature is usually 50 to 200° C., preferably 80 to 190° C., and the kneading duration is usually 30 seconds to 30 minutes, preferably one minute to 30 minutes. In a final kneading step that includes kneading the vulcanizing agents and vulcanization accelerators, the kneading temperature is usually 100° C. or lower, preferably from room temperature to 80° C. The composition obtained after kneading the vulcanizing agents and vulcanization accelerators is usually vulcanized by, for example, press vulcanization. The vulcanization temperature is usually 120 to 200° C., preferably 140 to 180° C.

The rubber composition may be used in, for example, tires, rubber footwear soles, rubber floor materials, vibration proof rubbers, seismic isolators, flame butyl rubbers, belts, tubes, packing materials, medical stoppers, and other industrial rubber products. In particular, the rubber composition can preferably be used as a rubber composition for tires owing to its ability to improve durability (tensile strength at break), handling stability, fuel economy, and other properties.

The rubber composition may suitably be used in pneumatic tires. Such pneumatic tires can be produced using the rubber composition by usual methods. Specifically, an unvulcanized rubber composition into which materials are compounded as needed may be extruded into the shape of a tire component and then assembled with other tire components in a tire building machine in a usual manner to build an unvulcanized tire, which may then be heated and pressurized in a vulcanizer to produce a tire.

EXAMPLES

The present invention will be described in greater detail with reference to, but not limited to, examples.

[Evaluation Method]

CNC/surfactant composites and CNF/surfactant composites were evaluated as described below.

(Moisture Content)

The moisture content (%) of each CNC/surfactant or CNF/surfactant composite was measured in accordance with JIS A 1476:2006 "Measuring method for moisture content of building materials by drying at elevated temperature".

(Recovery Ratio)

To 10 g of each CNC/surfactant or CNF/surfactant composite was added 500 g of pure water, and they were stirred and ultrasonicated for 10 minutes to effect redispersion. CNC/surfactant or CNF/surfactant redispersions were thus prepared.

The recovery ratio (%) of the CNC/surfactant or CNF/surfactant redispersions was determined by the following equation. A higher recovery ratio indicates better redispersibility.

[Recovery ratio (%)]=[Viscosity(mPa·s) of CNC/surfactant or CNF/surfactant redispersion]/[Viscosity(mPa·s) of CNC slurry (CNC aqueous dispersion) or CNF slurry(CNF aqueous dispersion)]×100

The viscosity (mPa·s) was measured at 23° C. using a tuning-fork vibration viscometer.

The chemicals used in the preparation of the CNC/surfactant composites and the like are listed below.

CNC: cellulose nanocrystal (average fiber length: 100 to 300 nm, average fiber diameter: 5 to 50 nm, degree of crystallinity: 80%, solids content: 2% by mass) available from Inno Tech Alberta Surfactant A: NUOSPERSE FX 605 (anionic surfactant, sodium polycarboxylate (hydrophobic group: hydrocarbon group, hydrophilic group: $COO^-$ (carboxyl group), counter ion: $Na^+$), Mw: 6000) available from Elementis PLC Surfactant B: DEMOL EP (anionic surfactant, sodium polycarboxylate (hydrophobic group: isobutylene group, hydrophilic group: $COO^-$ (carboxyl group), counter ion: $Na^+$), Mw: 20000) available from Kao Corporation Surfactant C: DEMOL NL (anionic surfactant (hydrophobic group: hydrocarbon group, hydrophilic group: $SO_3^-$ (sulfonate group), counter ion: Nat), Mw: 20000) available from Kao Corporation Surfactant D: NUOSPERSE FX 600 (anionic surfactant, amine polycarboxylate (hydrophobic group: phenyl group, hydrophilic group: $COO^-$ (carboxyl group), counter ion: $NH_4^+$), Mw: 2000) available from Elementis PLC Surfactant E: TERIC 16A29 (nonionic surfactant, $CH_3(CH_2)_{15}(OC_2H_4)_{29}$—OH)) available from Huntsman Corporation (Preparation of CNC/Surfactant Composite)

To a 1% by mass CNC aqueous dispersion prepared from CNC and pure water was added the surfactant in the predetermined amount shown in the formulation in Table 1, and they were stirred using a high-speed homogenizer at room temperature (20 to 30° C.) for five minutes to give a mixture (liquid mixture) containing CNC and the surfactant. Then, the liquid mixture was filtrated and dried (170° C., 60 minutes) to obtain a CNC/surfactant composite.

TABLE 1

| | CNC/surfactant composite | | | | | |
|---|---|---|---|---|---|---|
| | A | B | C | D | E | X |
| Surfactant | Surfactant A (anionic, Mw: 6,000) | Surfactant B (anionic, Mw: 20,000) | Surfactant C (anionic, Mw: 20,000) | Surfactant D (anionic, Mw: 2,000) | Surfactant E (nonionic) | — |
| Amount (parts by mass) of surfactant relative to 100 parts by mass (solids content) of CNC | 10 | 10 | 10 | 10 | 10 | — |
| Moisture content (% by mass) | 7 | 8 | 6 | 7 | 8 | 8 |
| Recovery ratio (%) of redispersion | 100 | 80 | 80 | 50 | 50 | 50 |

The chemicals used in the preparation of the CNF/surfactant composites and the like are listed below.

Microfibrillated plant fiber: biomass nanofiber (trade name "BiNFi-s cellulose", solids content: 2% by mass, moisture content: 98% by mass, average fiber diameter: 20 to 50 nm, average fiber length: 500 to 1000 nm, degree of crystallinity: 70%) available from Sugino Machine Limited TEMPO: 2,2,6,6-tetramethylpiperidine-1-oxyl Sodium bromide: a product available from FUJIFILM Wako Pure Chemical Corporation Sodium hypochlorite: a product available from Tokyo Chemical Industry Co., Ltd.

NaOH: NaOH available from FUJIFILM Wako Pure Chemical Corporation

Surfactant A: NUOSPERSE FX 605 (anionic surfactant, sodium polycarboxylate (hydrophobic group: hydrocarbon group, hydrophilic group: $COO^-$ (carboxyl group), counter ion: Nat), Mw: 6000) available from Elementis PLC Surfactant B: DEMOL EP (anionic surfactant, sodium polycarboxylate (hydrophobic group: isobutylene group, hydrophilic group: $COO^-$ (carboxyl group), counter ion: Nat), Mw: 20000) available from Kao Corporation Surfactant F: polyethylene oxide (Mw: 150000)

(Preparation of Microfibrillated Plant Fiber Dispersion (CNF Aqueous Dispersion))

An amount of 10 g of the microfibrillated plant fiber, 150 mg of TEMPO, and 1000 mg of sodium bromide were dispersed in 1000 mL of water. To the dispersion was added a 15% by mass sodium hypochlorite aqueous solution such that the amount of sodium hypochlorite was 5 mmol per gram (absolute dry weight) of the microfibrillated plant fiber, followed by starting a reaction. The pH during the reaction was maintained at 10.0 by dropwise adding a 3M aqueous NaOH solution. The reaction was considered to be completed when the pH no longer changed. The reaction product was filtered through a glass filter and then subjected to five cycles of washing with plenty of water and filtration, thereby obtaining a water-impregnated, reacted fiber with a solids content of 15% by mass.

The fiber was diluted to form a 1% by mass CNF aqueous dispersion.

(Preparation of CNF/Surfactant Composite)

To the 1% by mass CNF aqueous dispersion was added the surfactant in the predetermined amount shown in the formulation in Table 2, and they were stirred using a high-speed homogenizer at room temperature (20 to 30° C.) for five minutes to give a mixture (liquid mixture) containing CNF and the surfactant. Then, the liquid mixture was filtrated and dried (170° C., 60 minutes) to obtain a CNF/surfactant composite.

TABLE 2

| | CNF/surfactant composite | | | |
|---|---|---|---|---|
| | A | B | F | Y |
| Surfactant | Surfactant A (anionic, Mw: 6,000) | Surfactant B (anionic, Mw: 20,000) | Surfactant F (PEO, Mw150,000) | — |
| Amount (parts by mass) of surfactant relative to 100 parts by mass (solids content) of CNF | 20 | 20 | 20 | — |
| Moisture content (% by mass) | 7 | 5 | 7 | 8 |
| Recovery ratio (%) of redispersion | 100 | 80 | 50 | 50 |

The chemicals used in the preparation of rubber compositions are listed below.

Natural rubber latex: field latex obtained from Muhibbah LATEKS

CNC/surfactant redispersions: prepared as described in the recovery ratio evaluation CNF/surfactant redispersions: prepared as described in the recovery ratio evaluation Carbon black: SHOBLACK N220 ($N_2SA$: 111 $m^2/g$) available from Cabot Japan K.K.

Oil: process X140 available from Japan Energy Corporation

Antioxidant: OZONONE 6C (N-(1,3-dimethylbutyl)-N'-phenyl-p-phenylenediamine) available from Seiko Chemical Co., Ltd.

Zinc oxide: zinc oxide #1 available from Mitsui Mining & Smelting Co., Ltd.

Stearic acid: stearic acid "TSUBAKI" available from NOF Corporation

Sulfur: powdered sulfur available from Tsurumi Chemical Industry Co., Ltd.

Vulcanization accelerator: NOCCELER NS (N-tert-butyl-2-benzothiazolylsulfenamide) available from Ouchi Shinko Chemical Industrial Co., Ltd.

(Preparation of CNC/Natural Rubber Composite or CNF/Natural Rubber Composite)

The CNC/surfactant redispersion A, B, C, D, or E, or the CNF/surfactant redispersion A, B, or F was mixed with the natural rubber latex at a ratio of 10 parts by mass of CNC or CNF (solids content) relative to 100 parts by mass of the rubber solids, and they were stirred using a high-speed homogenizer at room temperature for five minutes to prepare a compounded latex having a pH of 10.2. To the compounded latex was added a 2% by mass formic acid aqueous solution at room temperature to adjust the pH to 3 to 4 to form coagula. The coagula were filtered and dried. CNC/natural rubber composites A, B, C, D, and E, and CNF/natural rubber composites A, B, and F were thus prepared.

Moreover, a CNC/natural rubber composite X and a CNF/natural rubber composite Y were prepared as described above, except that the CNC aqueous dispersion (no surfactant) and the CNF aqueous dispersion (no surfactant) were used instead of the CNC/surfactant redispersion and the CNF/surfactant redispersion, respectively.

<Preparation of Rubber Composition>

The materials other than the sulfur and vulcanization accelerator shown in the formulation in Table 3 or 4 were kneaded using a 1.7-L Banbury mixer at 150° C. for four minutes. Then, the sulfur and vulcanization accelerator were added to the kneaded mixture and they were kneaded using an open roll mill at 80° C. for four minutes to give an unvulcanized rubber composition. The unvulcanized rubber composition was press-vulcanized at 170° C. for 12 minutes using a 2 mm-thick mold to obtain a vulcanized rubber composition.

The vulcanized rubber compositions prepared as above were evaluated as described below. It should be noted that Comparative Examples 1-3 and 2-2 are used as standards of comparison in Tables 3 and 4, respectively.

[Evaluation Method]

(CNC or CNF Dispersibility)

The vulcanized rubber compositions were observed with an electron microscope to evaluate dispersibility of CNC or CNF in the rubber matrix. The CNC or CNF dispersibility of each formulation example is expressed as an index relative to the standard comparative example taken as 100. A higher index indicates better dispersibility of CNC or CNF.

(Tensile Strength at Break)

A tensile test was performed on No. 3 dumbbell-shaped rubber specimens prepared from the vulcanized rubber compositions in accordance with JIS K 6251 "Rubber, vulcanized or thermoplastic—Determination of tensile stress-strain properties" to measure the tensile strength at break (TB). The TB of each formulation example is expressed as an index relative to the rubber specimen of the standard comparative example (standard specimen) (=100) using the equation below. A higher TB index indicates a higher tensile strength at break and better reinforcement and durability.

$$(\text{TB index}) = (\text{TB of each formulation example})/(\text{TB of standard comparative example}) \times 100$$

(Fuel Economy)

The loss tangent (tan δ) and complex modulus E* (MPa) of each formulation example (vulcanized rubber composition) were measured using a viscoelastic spectrometer VES (Iwamoto Seisakusho Co., Ltd.) at a temperature of 70° C., an initial strain of 10%, a dynamic strain of 1%, and a frequency of 10 Hz. Tan δ and E* indexes of each formulation example were calculated using the tan δ and E* of the standard comparative example each taken as 100. A higher tan δ index indicates a lower rolling resistance and better fuel economy. A higher E* index indicates better modulus. In addition, a balance index calculated as "E* index×tan δ index/100" was determined. A higher balance index indicates a better balance between modulus and fuel economy.

TABLE 3

| | | Example | | | Comparative Example | | |
|---|---|---|---|---|---|---|---|
| | | 1-1 | 1-2 | 1-3 | 1-1 | 1-2 | 1-3 |
| Formulation (parts by mass) | CNC/natural rubber composite A (amount of CNC) | 110 (10) | | | | | |
| | CNC/natural rubber composite B (amount of CNC) | | 110 (10) | | | | |
| | CNC/natural rubber composite C (amount of CNC) | | | 110 (10) | | | |
| | CNC/natural rubber composite D (amount of CNC) | | | | 110 (10) | | |
| | CNC/natural rubber composite E (amount of CNC) | | | | | 110 (10) | |
| | CNC/natural rubber composite X (amount of CNC) | | | | | | 110 (10) |
| | Carbon black | 30 | 30 | 30 | 30 | 30 | 30 |
| | Oil | 10 | 10 | 10 | 10 | 10 | 10 |
| | Antioxidant | 3 | 3 | 3 | 3 | 3 | 3 |
| | Zinc oxide | 3 | 3 | 3 | 3 | 3 | 3 |
| | Stearic acid | 2 | 2 | 2 | 2 | 2 | 2 |
| | Sulfur | 1.5 | 1.5 | 1.5 | 1.5 | 1.5 | 1.5 |
| | Vulcanization accelerator | 1 | 1 | 1 | 1 | 1 | 1 |
| Evaluation | CNC dispersibility | 130 | 120 | 120 | 100 | 100 | 100 |
| | Tensile strength at break (TB index) | 110 | 105 | 108 | 85 | 80 | 100 |
| | Fuel economy (tan δ index) | 110 | 105 | 105 | 90 | 80 | 100 |
| | Complex modulus (E* index) | 120 | 110 | 110 | 105 | 105 | 100 |
| | Balance (=E* × tan δ/100) | 132 | 116 | 116 | 95 | 84 | 100 |

CNC/natural rubber composite X: No surfactant

TABLE 4

| | | Example | | Comparative Example | |
|---|---|---|---|---|---|
| | | 2-1 | 2-2 | 2-1 | 2-2 |
| Formulation (parts by mass) | CNF/natural rubber composite A (amount of CNF) | 110 (10) | | | |
| | CNF/natural rubber composite B (amount of CNF) | | 110 (10) | | |
| | CNF/natural rubber composite F (amount of CNF) | | | 110 (10) | |
| | CNF/natural rubber composite Y (amount of CNF) | | | | 110 (10) |
| | Carbon black | 30 | 30 | 30 | 30 |
| | Oil | 10 | 10 | 10 | 10 |
| | Antioxidant | 3 | 3 | 3 | 3 |
| | Zinc oxide | 3 | 3 | 3 | 3 |
| | Stearic acid | 2 | 2 | 2 | 2 |
| | Sulfur | 1.5 | 1.5 | 1.5 | 1.5 |
| | Vulcanization accelerator | 1 | 1 | 1 | 1 |
| Evaluation | CNF dispersibility | 120 | 115 | 80 | 100 |
| | Tensile strength at break (TB index) | 110 | 105 | 90 | 100 |
| | Fuel economy (tan δ index) | 110 | 105 | 90 | 100 |
| | Complex modulus (E* index) | 130 | 110 | 95 | 100 |
| | Balance (=E* × tan δ/100) | 143 | 116 | 86 | 100 |

CNF/natural rubber composite Y: No surfactant

As shown in Tables 3 and 4, composites containing an ionic surfactant having a weight average molecular weight of 3000 or more and a nanocellulose exhibited excellent redispersibility in water, despite their moisture content of lower than 10% by mass. Moreover, rubber compositions containing the composites exhibited good dispersibility of the nanocellulose (good CNC or CNF dispersibility) and also had excellent tensile strength at break and fuel economy as well as an excellent balance between modulus and fuel economy.

The invention claimed is:

1. A method for producing a rubber composition, comprising a nanocellulose/surfactant composite, and at least one rubber selected from the group consisting of isoprene-based rubber, polybutadiene rubber and styrene-butadiene rubber, wherein the nanocellulose/surfactant composite comprises a nanocellulose and a surfactant, and has a moisture content of lower than 10%, and wherein the surfactant comprises an ionic surfactant having a weight average molecular weight of 3000 or more, the method comprising:

a first step of mixing the ionic surfactant with a dispersion of the nanocellulose to prepare a liquid mixture;

a second step of drying the liquid mixture to prepare a dried nanocellulose/surfactant composite;

a third step of redispersing in water the dried nanocellulose/surfactant composite obtained in the second step to form a redispersion, and mixing the redispersion with a latex of the at least one rubber to prepare a compounded latex; and a fourth step of coagulating the compounded latex to form the rubber composition.

2. The method according to claim 1, wherein the nanocellulose comprises at least one of a microfibrillated cellulose or a cellulose nanocrystal.

3. The method according to claim 2, wherein the nanocellulose is microfibrillated cellulose that has an average fiber diameter of 2 to 50 nm, an average fiber length of 10 μm or less, and a degree of crystallinity of 60 to 90%.

4. The method according to claim 2, wherein the nanocellulose is cellulose nanocrystal that has an average fiber diameter of 2 to 50 nm, an average fiber length of 500 nm or less, and a degree of crystallinity of 70% or more.

5. The method according to claim 1, wherein the ionic surfactant has an average molecular weight of 3,000 to 50,000.

6. The method according to claim 1, wherein the ionic surfactant has an average molecular weight of 4,000 to 30,000.

7. The method according to claim 2, wherein the ionic surfactant has an average molecular weight of 3,000 to 50,000.

8. The method according to claim 2, wherein the ionic surfactant has an average molecular weight of 4,000 to 30,000.

* * * * *